United States Patent
Molz

(10) Patent No.: US 8,752,726 B2
(45) Date of Patent: Jun. 17, 2014

(54) CUP INSULATOR AND CUSTOMIZABLE INSERT

(76) Inventor: Marcy L. Molz, Groveland, CA (US)

( * ) Notice: Subject to any disclaimer, the term of this patent is extended or adjusted under 35 U.S.C. 154(b) by 358 days.

(21) Appl. No.: 13/158,566

(22) Filed: Jun. 13, 2011

(65) Prior Publication Data

US 2011/0307421 A1 Dec. 15, 2011

Related U.S. Application Data

(60) Provisional application No. 61/354,696, filed on Jun. 14, 2010.

(51) Int. Cl.
*B65D 25/00* (2006.01)
*B65D 81/38* (2006.01)

(52) U.S. Cl.
CPC ......... *B65D 81/3876* (2013.01); *Y10S 220/903* (2013.01)
USPC ........... 220/739; 220/737; 220/738; 220/903; 705/15; 705/500

(58) Field of Classification Search
CPC . A47G 23/0216; G06Q 99/00; B65D 81/3876
USPC .......... 705/15, 27, 500; 220/62.12, 737, 738, 220/739, 903; 235/375
See application file for complete search history.

(56) References Cited

U.S. PATENT DOCUMENTS

| | | |
|---|---|---|
| 2,844,893 A | 7/1958 | Keller |
| 4,268,567 A | 5/1981 | Harmony |
| 4,534,391 A | 8/1985 | Ventimiglia et al. |
| 4,540,611 A * | 9/1985 | Henderson ............. 220/739 |
| 4,685,583 A | 8/1987 | Noon |
| 4,951,910 A | 8/1990 | March |
| 4,986,089 A | 1/1991 | Raab |
| 5,102,036 A | 4/1992 | Orr et al. |
| 5,209,367 A | 5/1993 | Van Musscher et al. |
| 5,729,922 A | 3/1998 | Peterson et al. |
| 5,992,073 A | 11/1999 | Wolpa |
| 6,286,709 B1 * | 9/2001 | Hudson ............. 220/739 |
| 6,591,524 B1 | 7/2003 | Lewis et al. |
| 7,000,801 B2 | 2/2006 | Rodriguez |
| 7,922,031 B1 * | 4/2011 | Prince ............. 220/739 |

(Continued)

FOREIGN PATENT DOCUMENTS

EP 1466841 10/2004

OTHER PUBLICATIONS

Search Report and Written Opinion mailed Feb. 24, 2012 from International Serial No. PCT/US2011/040198 filed Jun. 13, 2011.

*Primary Examiner* — Ryan Zeender
*Assistant Examiner* — Hunter Wilder
(74) *Attorney, Agent, or Firm* — Geeta Kadambi; Riddhi IP LLC

(57) ABSTRACT

A sleeve containing an insert forming a cup holder is described. The inserts are placed in the sleeve. The sleeve is customizable by varying the color, writing and bar coding. The individual business may also display their logo on the sleeve or insert. These cup holders are personal to the user and can be repeatedly used. This enables the individual business to save money. The sleeve and insert as cup holder can be made up of recyclable material. The user may use a device implanted on or in a sleeve to pay and/or order the product using the sleeve.

10 Claims, 5 Drawing Sheets

(56) References Cited

U.S. PATENT DOCUMENTS

| | | |
|---|---|---|
| 2003/0141976 A1 | 7/2003 | Dickinson et al. |
| 2005/0103795 A1 | 5/2005 | Hall |
| 2006/0186129 A1* | 8/2006 | Allnutt et al. ............... 220/737 |
| 2007/0215618 A1* | 9/2007 | Wright et al. ............. 220/62.12 |
| 2007/0215626 A1* | 9/2007 | Wright et al. ............... 220/737 |
| 2007/0257049 A1 | 11/2007 | Tolan |
| 2008/0201241 A1* | 8/2008 | Pecoraro ....................... 705/27 |
| 2009/0200322 A1 | 8/2009 | Hunter |
| 2010/0108755 A1 | 5/2010 | Fuerstenberg |
| 2010/0162598 A1 | 7/2010 | Bruce |
| 2011/0178882 A1* | 7/2011 | Grauel et al. ............... 220/737 |

\* cited by examiner

CUP INSULATOR AND CUSTOMIZABLE INSERT

CROSS REFERENCE TO RELATED APPLICATIONS

This application claims priority to U.S. Provisional Patent Application No. 61/354,696 filed on Jun. 14, 2010. This application is hereby incorporated by reference in its entireties for all of its teachings.

FIELD OF INVENTION

The present invention is generally directed to an article of manufacture for use in conjunction with beverage cups of type having a smooth cylindrical surface or tapered sidewall and no handle. The present invention is directed to an insulating sleeve having an insert that is customizable for personal use. More particularly, the present invention is directed to reusable insulating sleeve and an insert to securely fit around a beverage cup such that the sleeve and the insert insulates the user's hand against temperature differences from the beverage of choice and assists the user in firmly grasping and handling the cup.

BACKGROUND

Conventional disposable cups, of formed paperboard or an appropriate food-compatible synthetic resin or plastic, are normally of a thin wall construction with a strength little more than that required to contain the beverage for which the cup is designed. Such cups are for the most part sufficient for their intended purposes, and require a minimal amount of material resulting in cost advantages.

However, to overcome these deficiencies and to further protect the user, some use loose jacket paper holders, that are made of corrugated paper to provide insulation. Further, they can be used only once and they have to be disposed. In order to reduce waste a better solution needs to be proposed.

SUMMARY

The present disclosure provides an insulated protective sleeve which can be readily slipped onto the outside surface of a conventional tapered hot drink cup and which is effective to insulate the fingers of the user from the heat and cold of the content.

In one embodiment, the cup holder is made of a surface A and surface B. In another embodiment, surface A has two sheets that are sealed together. In another embodiment, the two sheets enclose a third sheet before they are sealed together. In another embodiment, two sets of first sheet and second sheet enclosing a third sheet are sealed together at the edges to form a cup holder.

In one embodiment, a synthetic material is used as first sheet and second sheet. In another embodiment, a thermal insulating material is used as a third sheet.

In another embodiment, the sleeve is folded in a flat configuration, using little space. The structure allows easy unfolding and quick attachment to a cup, thereby reducing the possibility of spilling the contents of the cup.

In one embodiment, the user, by writing on the sleeve, is able to customize their preference, name and order on the sleeve. The user can indicate his drink preference by writing on the insert. The user can write their name for the order and the service provider can be efficient to serve in a short time as he does not have to write the drink preference or the customer name.

The insert is also made of insulating material, which would provide additional layer of insulation with the sleeve. The insert can be made of colored material and preprinted with service provider specific logo. In another embodiment the sleeve may be customizable with different non transparent colored material.

In another embodiment, the sleeve may be transparent to show the logo or the writing of the insert.

In another embodiment, the surface A and surface B may be heat sealed at the edges. Edges of the sleeve may be closed at the ends with no openings, hence offered as a one piece product. In another embodiment, the insulating sleeve can be tapered or be uniform to fit the cup snugly and enables the user to comfortably grasp and hold the cup for use.

In one embodiment, surface B may have specific area for printing and/or writing personal name, a logo, product preference; request a barcode to indicate the preferences, a sensor for payment. In another embodiment, the sensor may be used for at least one of the following functions such as uploading the preference to preorder via internet, communicate with the store window to print a slip, make payment and a talking sign for hearing impaired, visually impaired and/or both to communicate their order with the store personnel.

The product and method of making the product disclosed herein may be implemented in any means for achieving various aspects. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

The present invention is directed to an insulating sleeve having an insert that is customizable for personal use and re-use. Although the present embodiments have been described with reference to specific example embodiments, it will be evident that various modifications and changes may be made to these embodiments without departing from the broader spirit and scope of the various embodiments.

Figure 1:
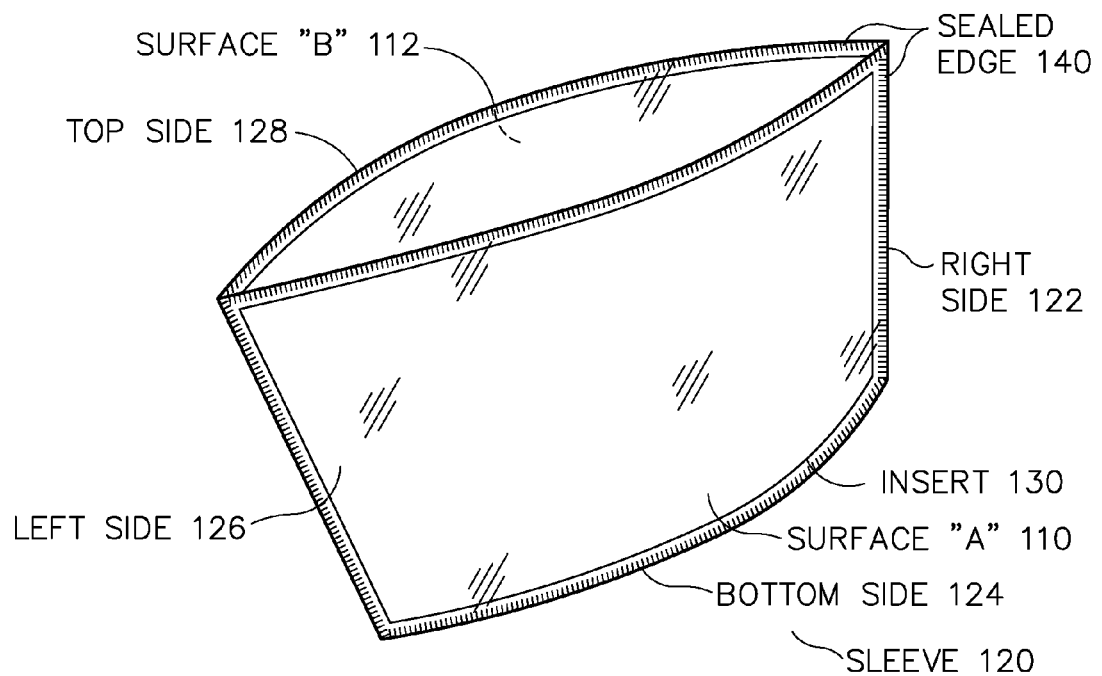
FIG. 1 is a view of the sleeve and the insert as a cup holder.

FIG. 1 is a representation of a sleeve 120 to be used as a cup holder and insulate an individuals hand from hot and cold temperature of the contents of the cup. The sleeve 120 comprises of a surface "A" 110 and a surface "B" 112. The sleeve 120 is larger than the insert 130. The insert 130 can be placed into the sleeve 120. The sleeve 120 can be wrapped around a cup to insulate the users from temperature variances. The sleeve 120 has a surface A 110 and surface B 112 that are heat sealed on right side 122 and left side 126 to form a union of the surface A 110 and surface B 112. The bottom side 124 and the top side 128 are sealed individually to create an opening for the sleeve 120 to be placed around the cup.

Figure 2:
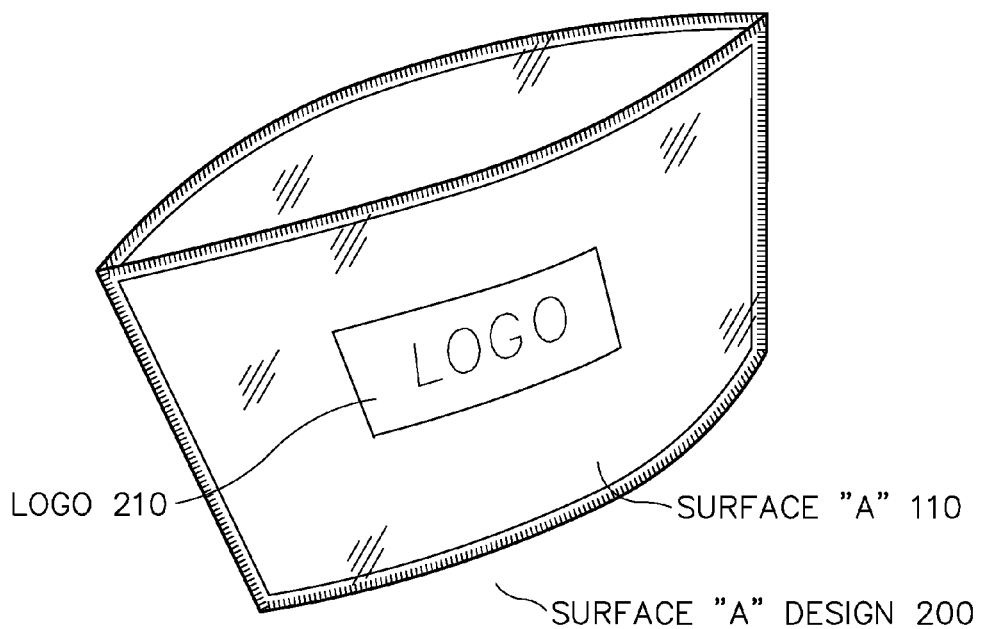
FIG. 2 is a view of the surface A design on the sleeve showing a print area for a logo.

As shown in FIG. 2, in surface A design 200, the sleeve 120 has a specific area for logo 210. The logo may be imprinted, embossed and/or pasted on to surface A 110. Surface A may be made up of transparent material and the logo 210 may be visible that has been printed on the inside insert 130. The surface A and B may be made up of vinyl material or any flexible material that is pliable, soft and easy to grip.

Figure 3A:
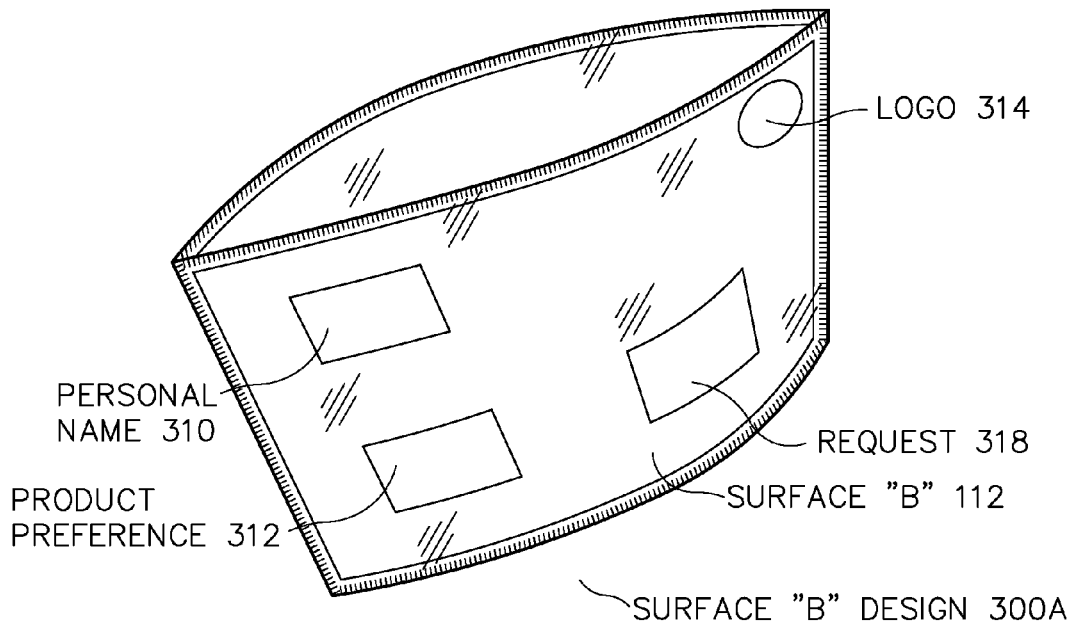
FIGS. 3A and 3B is a view of the surface B area with various areas for printing and/or writing on the sleeve.
Figure 3B:
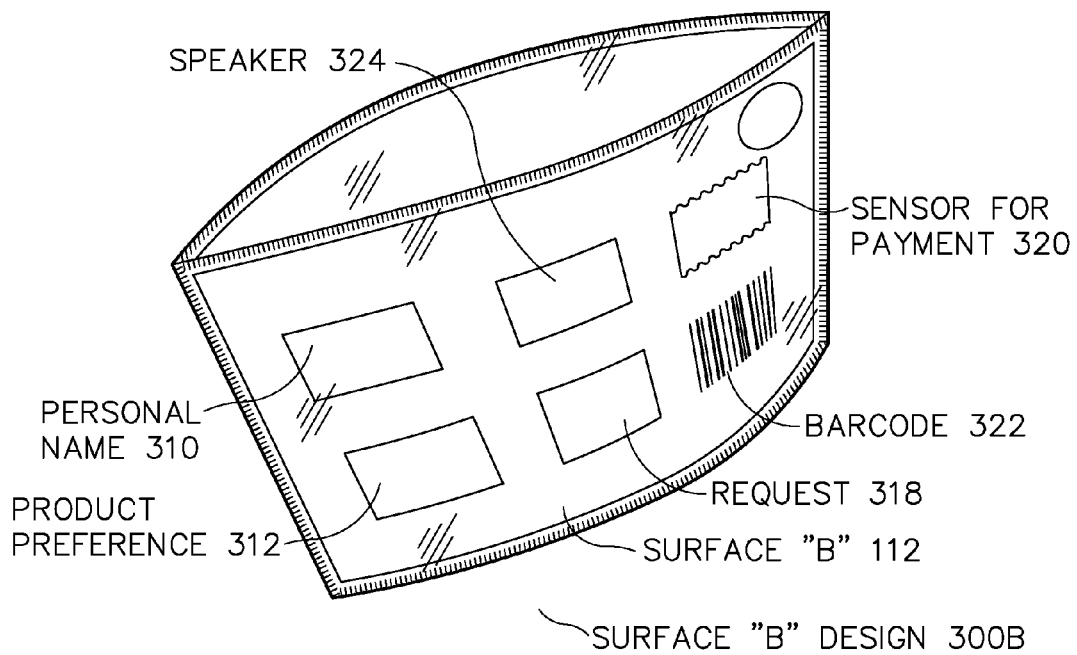

As shown in FIG. 3A, the surface B design 300A has specific areas to write a personal name 310, to write a product preference 312 and for a request 318 that could indicate a specific request. In FIG. 3B it shows that there may be additional area wherein a sensor 320 may be placed that would enable the user to place orders and/or make payments. The surface B may also have a speaker 324 area attached to it for enabling personnel to communicate with a provider of goods. It may have an amplifier or a translator as well.

Figure 4:
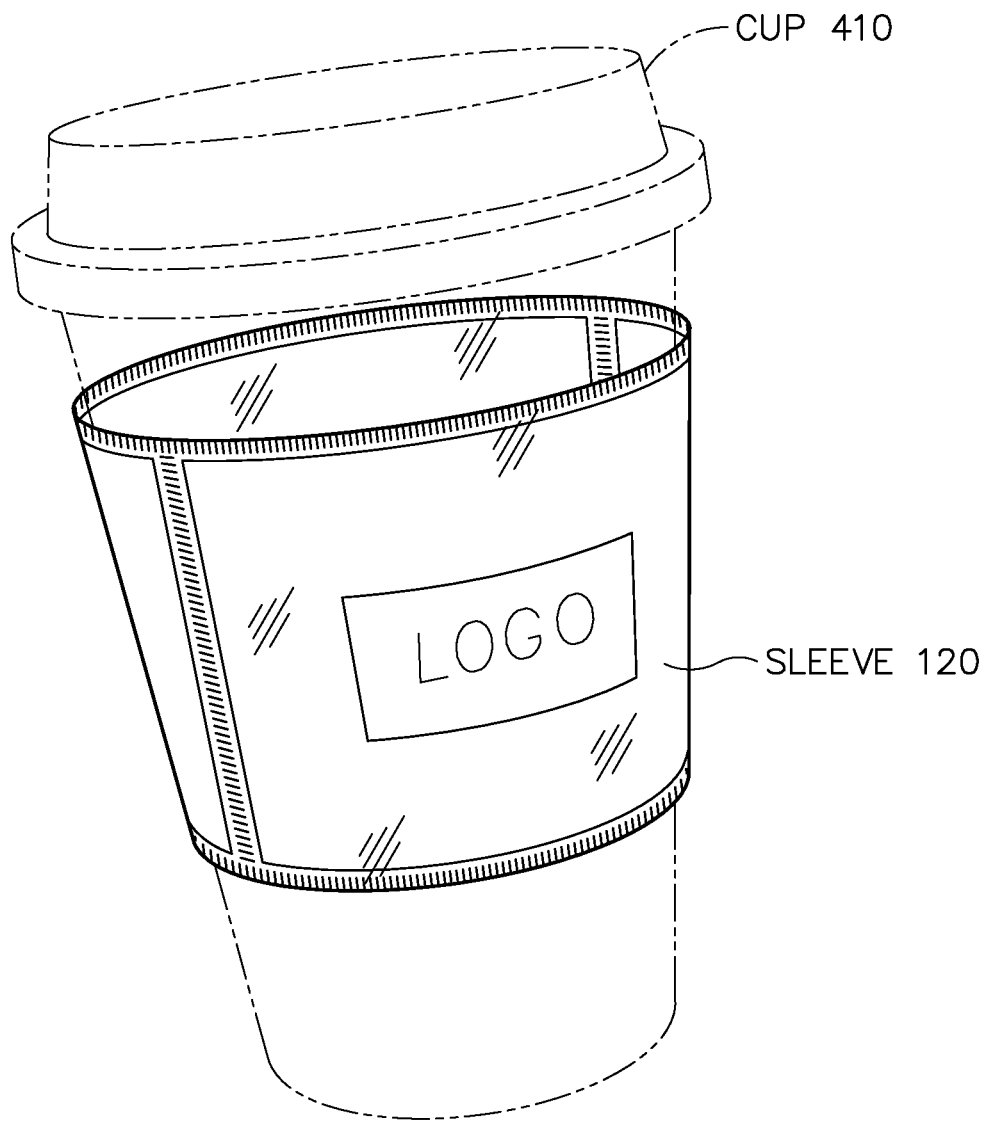
FIG. 4 illustrates a diagrammatic view of using the sleeve with the cup.

The sleeve 120 can be used to surround a cup 410, as shown in FIG. 4, to prevent the user from getting injured from thermal differences between the body and the cup 410. The sleeve 120 may be adjusted up or down to fit the contour of the cup 410. The sleeve may be reused as it is made of reusable material and will reduce waste production. It can be used as a personal or promotional item and companies may promote their brand by providing logos to be printed in area logo 210.

Figure 5:
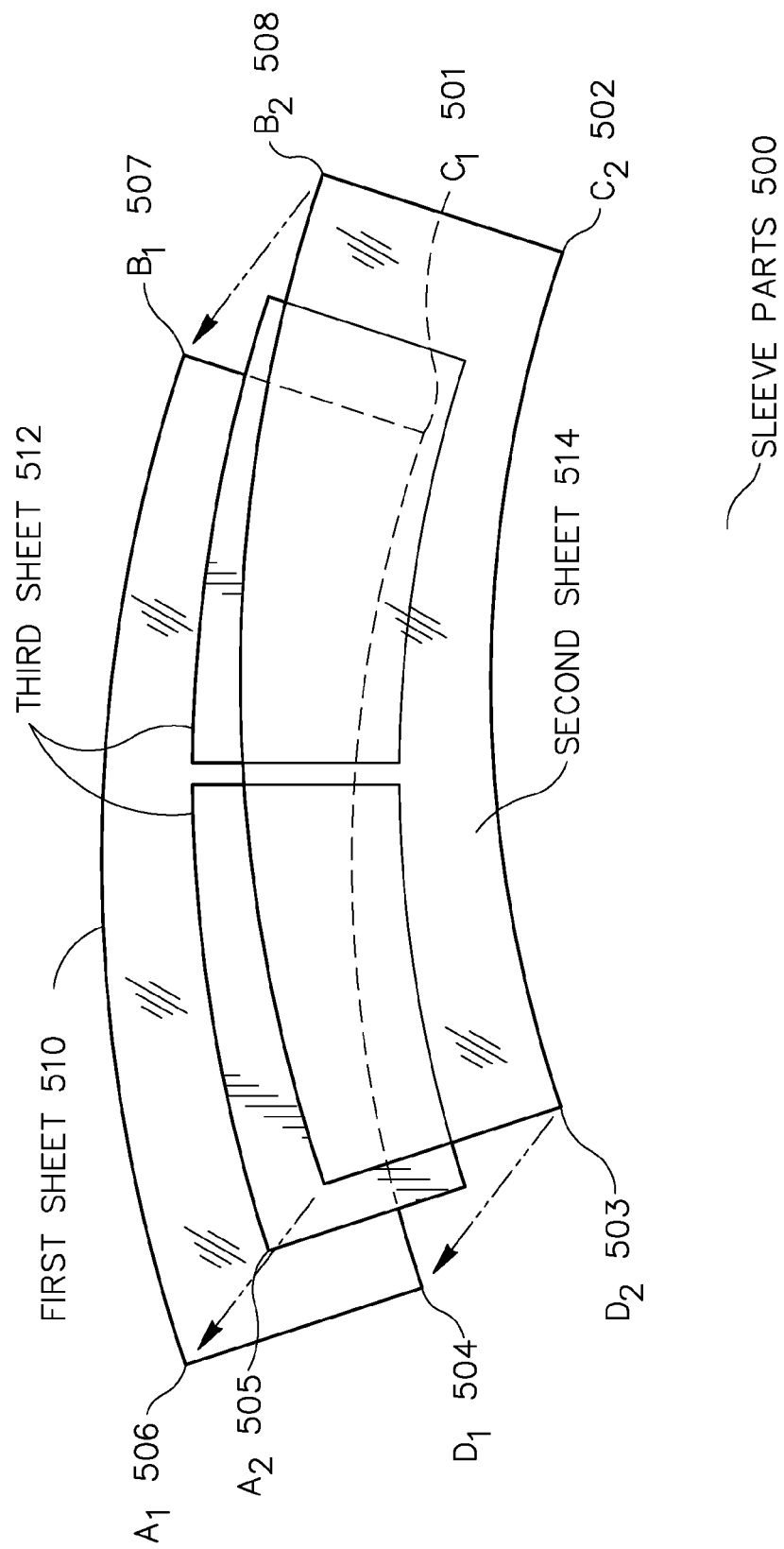
FIG. 5 is a diagrammatic view illustrating different sheets and their configuration to form a sleeve according to one embodiment.
Figure 5B:
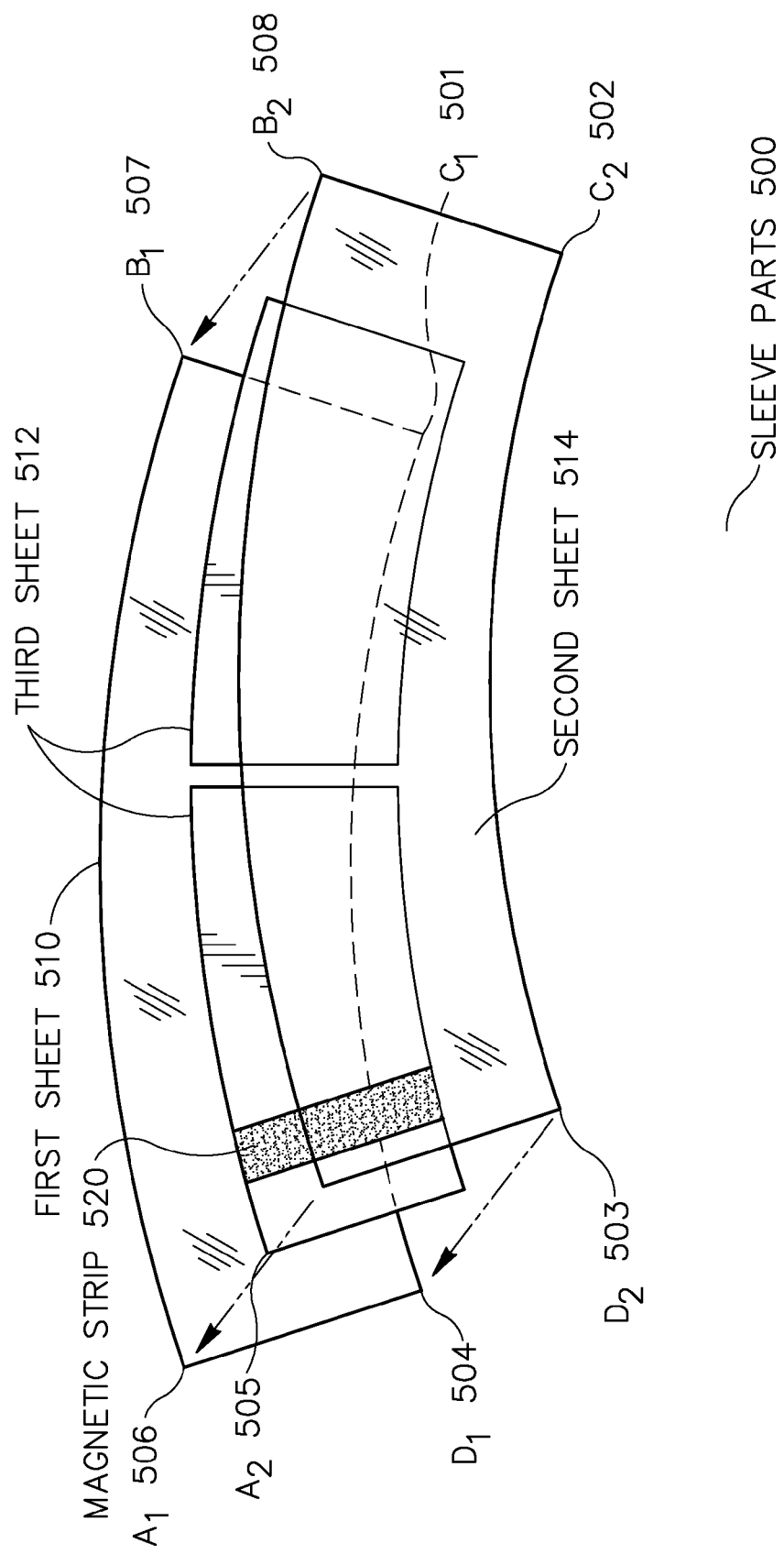
FIG. 5B shows a magnetic strip being implanted between the sheets for being used for various activities.

FIG. 5 shows a view of the sleeve 120. The sleeve 120 is made of dual layer material and has two surfaces, surface A 110 and surface B 112. Both the surfaces are parallel to each other and are bound on two sides. The sealing of the edges can be done by contiguous manufacturing in one embodiment, heat sealed or glued. The bonding enables the surface A 110 and surface B 112 to form a opening and accommodate the cup 410 within the opening.

The sleeve 120 may be made of transparent material in one embodiment. The transparent and/or opaque material may be temperature resistant, humidity resistant, slip resistant, and stain resistant. In one embodiment the material for the first sheet, the second sheet and third sheet may be biodegradable, plastic, nylon, polymers, vinyl, styrofoam and/or card board. The material may be rigid or elastic. For example, if the cup size is different elastic material would enable a user to expand the sleeve 120 to wrap around the cup 410 and hold it safely.

In one embodiment the sleeve may be semi-transparent or opaque on both surface A 110 and surface B 112 of the sleeve. In another embodiment it can be transparent on surface A 110 and semi-transparent on surface B 112. In another embodiment surface A 110 can be transparent and surface B 112 can be opaque.

In another embodiment, the sleeve is made of unitary piece of insulated material. Yet another embodiment, the insulating sleeve is unitary, seamless and transparent in nature such that indicia and graphics on the insert may be viewed through the sleeve. The shape of the sleeve 120 may be such that it is convenient to wrap it around a cup 410 of any size.

In FIG. 5, the sleeve 120 parts are shown in greater detail. The third sheet 512 is smaller in size than the first sheet 510 and second sheet 514. The smaller size makes it easy to place it in between the first and second sheets. The sealing of the edges comprising of the first sheet and the second sheet is convenient and stronger. The third sheet 512 can be made of a thin material or a thicker material to provide extra insulation to the user from thermal variations of the content of the cup 410. The edges A1 and A2, B1 and B2, C1 and C2 and D1 and D2 are sealed together to form an edge. A first pair of first sheet and second sheet form surface A and second pair of first sheet and the second sheet form surface B and both pairs have a third sheet between the first sheet and the second sheet to provide insulation.

The insert 130 may be made of iridescent material or plain colored material. It may have a magnetic strip or any other means for payment, as shown in FIG. 3B. The strip may be pre-programmed to contain the user product preference 312, personal name 310 and request 318. A provision for a prepaid card to be installed inside the first surface and the second surface may be made as well. The payment mode may be enabled to be recharged using internet type of mode.

The service provider can preprint their logo 210 or sell blank sleeves to users with or without the logo 210. The logo may be placed by at least one of printing, embossing, drawing and hand crafting. The third sheet 512 can be made of foam material to provide comfort and insulation. The light button may be placed underneath each preference and may be activated to display the product preference 312 or request 318 for the service provider by the user. The color code 330 may be press activated to create a color of choice. All the areas such as request 318, product preference 312, and the bar code 322 may be made of the same material for color coded information display.

The surface of the sleeve 120 may be smooth, rough or raised. For example, the rough surface may prevent it from slipping.

In addition, it will be appreciated that the various embodiments, materials, and shapes can be interchangeable used in the current embodiments and various combinations of the cup and the cup holder may be possible. Accordingly, the specification and drawings are to be regarded in an illustrative rather than a restrictive sense.

What is claimed is:

1. A method of making a cup holder, comprising:
providing a first sheet made of a first flexible material, having a first side and a second side defined by a first straight edge, a second straight edge opposite the first straight edge, a first curved edge and a second curved edge opposite the first curved edge, the first and second straight edges being generally perpendicular to the first and second curved edges;
providing a second sheet made of a second flexible material, having a first side and a second side defined by a first straight edge, a second straight edge opposite the first straight edge, a first curved edge and a second curved edge opposite the first curved edge, the first and second straight edges being generally perpendicular to the first and second curved edges;
disposing a first insert made of a sheet of insulating material in between the first sheet and the second sheet, wherein the first insert comprises at least one of a sensor for making payments and a barcode for identifying a predetermined order;
heat sealing the first curved edge and the second curved edge of the second sheet to the first curved edge and the second curved edge of the first sheet, respectively, to form a first pair where the first straight edges of the first and second sheets form a left side and the second straight edges of the first and second sheets form a right side;
providing a third sheet made of the second flexible material, having a first side and a second side defined by a first straight edge, a second straight edge opposite the first straight edge, a first curved edge and a second curved edge opposite the first curved edge, the first and second straight edges being generally perpendicular to the first and second curved edges;

providing a fourth sheet made of the first flexible material, having a first side and a second side defined by a first straight edge, a second straight edge opposite the first straight edge, a first curved edge and a second curved edge opposite the first curved edge, the first and second straight edges being generally perpendicular to the first and second curved edges;

disposing a second insert made of a sheet of insulating material between the third sheet and the fourth sheet, wherein imprinted on the second insert is at least one of a logo, a personal name area, a request area and a product preference area;

heat sealing the first curved edge and the second curved edge of the fourth sheet to the first curved edge and the second curved edge of the third sheet, respectively, to form a second pair where the first straight edges of the third and fourth sheets form a left side and the second straight edges of the third and fourth sheets form a right side; and heat sealing the left and right sides of the first pair to the left and right sides of the second pair respectively to form the cup holder.

2. The method of claim 1, wherein the imprinting is at least one of printing, embossing, drawing and hand crafting.

3. The method of claim 1, wherein the sheet of insulating material of the first or second insert is a synthetic material or card board.

4. The method of claim 1, wherein ordering a product is done by using the sensor.

5. The method of claim 1, wherein the first or second flexible material is at least one of temperature resistant, humidity resistant, slip resistant and stain resistant.

6. The method of claim 1, further comprising: disposing at least one of a speaker, an amplifier and a translator between the second pair to communicate with a service provider.

7. The method of claim 1, wherein the first or second flexible material is further made up of a transparent, semi-transparent or opaque material.

8. The method of claim 1, wherein the insulating material of the first or second insert is an iridescent or plain colored material.

9. The method of claim 1, further comprising: disposing a light button between the second pair to be activated to display at least one of the request area and the product preference area to a service provider.

10. The method of claim 9, further comprising: disposing a color code between the second pair to be press activated to create a color of choice for color coded information display.

* * * * *